Dec. 27, 1960   J. BOSCH   2,966,628
SYSTEM FOR MEASURING MOISTURE CONTENT OF PAPER OR THE LIKE
Filed Feb. 24, 1955
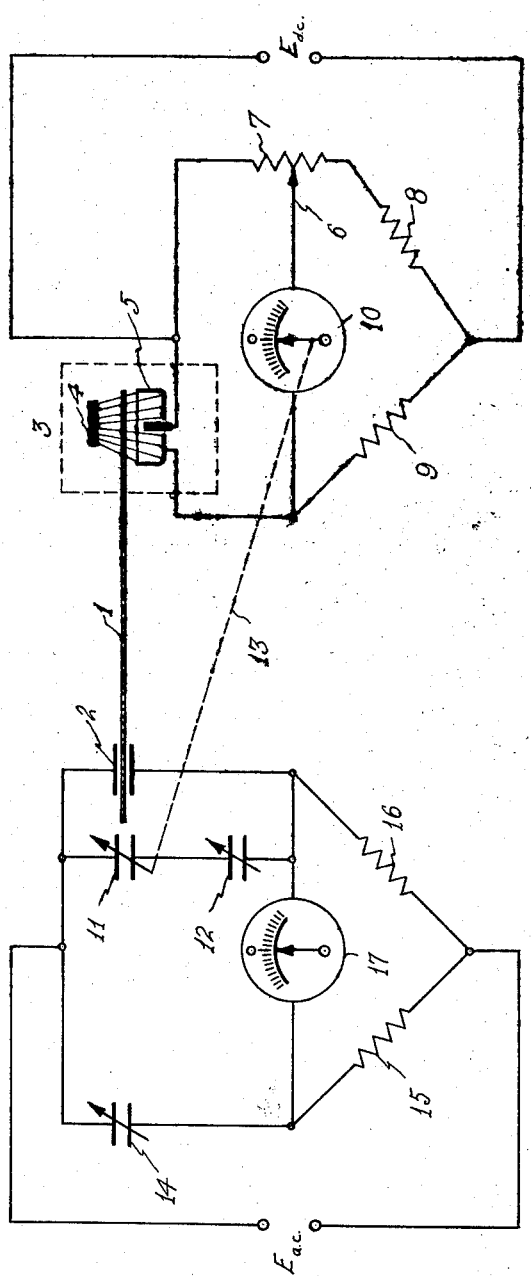
INVENTOR
JULIUS BOSCH
BY
his ATTORNEY

United States Patent Office 2,966,628
Patented Dec. 27, 1960

2,966,628

SYSTEM FOR MEASURING MOISTURE CONTENT OF PAPER OR THE LIKE

Julius Bosch, Erlangen-Bruck, Germany, assignor to Frieseke and Hoepfner, G.m.b.H., Erlangen-Bruck, Bavaria, Germany, a corporation of Germany Filed Feb. 24, 1955, Ser. No. 490,301

Claims priority, application Germany Feb. 25, 1954

10 Claims. (Cl. 324—61)

My invention relates to apparatus for accurately determining the moisture content of a material or materials, particularly such materials as may be produced by continuous process in sheet form and as may require a continuous check of moisture content, paper being an outstanding example.

A number of methods for determining the moisture content of paper are known. In one method the paper is weighed, dried and weighed again, and the weights compared to determine the moisture content. This however is a rather tedious and time-consuming method, and for a long time attempts have been made to develop suitable electric measuring methods. A few electrical methods not entirely satisfactory have been developed. One such method is based on the principle of measuring the conductance of paper. Another known method measures the moisture of the paper through determination of the dielectric constant of the paper by means of a capacity measurement. In the latter method paper is used as the dielectric medium of a measuring condenser. Since water has a dielectric constant of 80, and dry paper of approximately 2, changes in moisture content may be rather clearly indicated. However, there is a great disadvantage to this method in that moisture changes as well as changes in weight per unit area of the paper fiber jointly and severally result in changes in the capacity of the measuring condenser. Therefore only an approximate moisture determination can be obtained by this method and the determination is inaccurate to the extent that changes in weight from portion to portion of the paper fiber occur. The inaccuracy is rather serious in the case of paper of merchantable quality where the capacity changes effected by changes in paper fiber weight may be of the same order of magnitude as capacity changes effected by changes in moisture content. The methods previously known may have been satisfactory at most in the measurement of a high moisture content. A high moisture content renders considerations of fiber weight changes secondary. However, in the case of paper of merchantable quality it is of importance to accurately determine the inherently small moisture content and the yet smaller variations thereof. It is also of importance to determine weight changes in the paper fiber. The previously known methods have proven inadequate for such determinations.

As used herein pulp weight or total paper weight in the proper context refer to combined fiber and moisture weight present in the paper pulp, whereas fiber weight is intended to connote the weight of the paper apart from the moisture content of the pulp. In similar manner the term total material weight is intended to comprehend the combination of pure material weight plus moisture weight. Moisture, moisture weight and moisture content are used interchangeably to connote the weight of such moisture. Weight as used herein generally refers to the weight of a given unit sample area or portion of total material or total paper subjected to measurement.

It is an object of my invention to provide moisture measuring apparatus suitable for accurately determining moisture content of a material or materials regardless of changes in weight of the pure material apart from moisture changes therein. Another object of my invention is to provide moisture measuring apparatus suitable for accurately determining very low moisture content of a material or materials and variations thereof.

Another object of my invention is to provide moisture measuring apparatus suitable for accurately determining very low moisture content of a material or materials and variations thereof.

I propose to provide circuit means including a measuring condenser through which paper or the like may be fed to vary its capacity according to joint and several changes in the moisture content in accordance with its sensitivity thereto and weight of the pure material in accordance with its lesser sensitivity thereto. An adjustable condenser is provided in parallel with the measuring condenser and the voltage across these condensers is compared to the voltage across a comparison condenser to operate an indicator. In the absence of additional control means the circuit means would measure and the indicator would register total material weight, but inaccurately so in view of the disparity of sensitivities to pure material weight and moisture weight. Because of the presence of additional control means described immediately hereinafter the indicator however registers moisture changes in the materials. The adjustable condenser is controlled by a second circuit means for measurement of total material weight, including a radioisotope and a radiation detector and a second indicator also in accordance with joint and several changes. However the relation of the respective sensitivities of this circuit means differs from the relation of the sensitivities of the measuring condenser. The second circuit means and therefore its indicator are also responsive to joint and several changes in moisture weight and pure material weight with respective sensitivities thereto as will be explained hereinafter in the case of paper. Fortuitously the sensitivities of the second circuit means are substantially equal so that the second indicator correctly reflects pulp weight but this will not be the case in general for other materials. Regardless of the material the second circuit means responds to a pair of variables with unknown magnitude namely moisture and pure material weights. The first circuit means also and simultaneously responds to the same two variables. The adjustable condenser is controlled by the second indicator in effect to solve the pair of simultaneous equations in the two unknowns for the variable moisture. A necessary and sufficient condition for the solution of the pair of simultaneous equations is a known zero determinate. Translated into physical terms this requires that the ratio of the moisture sensitivity to the pure material sensitivity of the first circuit means (apart from the control from the second indicator) but unequal to the corresponding sensitivity ratio of the second circuit means. This is inherently so in the case of paper as is apparent from the above description and will be true for most dielectric reduction materials. The apparatus is calibrated so that deviations in only the moisture content from a predetermined ideal amount register on the first indicator.

The invention will be more fully set forth in the following description referring to the accompanying drawing, and the features of novelty will be pointed out with particularity in the claims annexed to and forming a part of this specification.

Referring to the drawing there is shown therein a diagrammatic illustration of apparatus embodying the features of my invention.

The apparatus includes two Wheatstone bridge circuits as shown. A strip 1 of paper or other material runs simultaneously through a measuring condenser 2 in one bridge circuit which is energized by the alternating voltage source $E_{ac}$ and the measuring point 3 in another bridge circuit which is energized by the direct voltage source $E_{dc}$. As a matter of convenience in illustration, the measuring condenser 2 and measuring point 3 are shown perceptibly spaced apart; however, it is to be understood that it is permissible and in fact desirable to have these measuring devices disposed closely side by side, so that paper of the same weight and moisture content per representative portion of the material can be measured by each of these measuring devices. At measuring point 3 there is provided a radio-active radiator 4, and ionization chamber 5 which constitutes one resistive arm of one bridge circuit. The resistance of this arm is determined by the number of ions received in chamber 5. This number in turn is dependent on the molecular concentration and atomic weight of the portion of the material disposed within the beam emanating from radiator 4. With the advance of strip 1, changes in moisture and pure material weight may occur separately or concurrently from one such portion to another such portion, and such changes jointly and severally effect resistance changes in the arm comprising chamber 5. In the case of paper, water and fiber have substantially equal atomic weights so that changes in unit weights of fiber and moisture produce substantially equal resistance changes. In effect, chamber 5 responds to total paper weight changes. The weight per unit area, i.e. of such portion, of the total paper is thus measured at point 3 and compared to a predetermined weight per unit area value as determined by the position of slider contact 6 on resistor 7 which provides another arm of the bridge. A third and fourth arm of the bridge includes resistors 8 and 9 respectively. An indicator 10 is provided which registers zero deflection as long as the measured weight of the total material at 3 corresponds to the predetermined weight, but which deflects whenever the weight of the strip 1 deviates from such value.

A certain capacity is provided by measuring condenser 2 in one arm of the other bridge circuit, such arm also including the series combination of adjustable condensers 11 and 12 in parallel with condenser 2. The capacity of the measuring condenser 2 is determined in part jointly by the moisture and the weight of fiber per unit area of the paper strip 1 i.e. the portion disposed between its plates. Air also contributes to the capacity determination. With the advance of paper, changes in the moisture and fiber weight may occur separately or concurrently and these changes jointly and severally effect capacity changes in measuring condenser 2. However in view of the aforementioned respective values of dielectric constant, a change of one unit of moisture effects a greater capacity change than a change of one unit of fiber weight. The capacity of condenser 11 is regulated by the operation of indicator 10 through suitable connections 13 according to the measured weight of the total material. As will be explained more fully hereinafter changes in total weight are taken into account in this way in the bridge circuit which includes condenser 2 and an accurate moisture measurement provided. Since the position of the rotor or other mechanically variably positionable element of the condenser 11 matches the indication of indicator 10, such position is of itself indicative of the total material weight. A comparison condenser 14 adjustable for a predetermined moisture content is provided in another arm of the bridge. The other two arms of the bridge include resistors 15 and 16. When the capacity of the combination of measuring condenser 2 together with condensers 11 and 12 equals the capacity of condenser 14, the indicating instrument 17 connected across the bridge registers zero.

Assume that the apparatus has been set up by the adjustment of the slider arm 6 on resistor 7, and adjustment of condensers 12 and 14 so that the indicators 10 and 17 both register zero corresponding to predetermined ideal weights of pure material and moisture content. The operation of the apparatus will be understood with reference to the following examples. If with constant moisture content the total paper weight, in this instance necessarily solely the fiber weight per unit area, changes, the result is a deflection of the deviation indicator 10 which adjusts condenser 11 through connections 13. The extent of deflection of indicator 10 is a measure of the deviation of total paper weight, in this instance necessarily solely the fiber weight, from the predetermined weight. Such adjustment compensates for a change in capacity of measuring condenser 2 due to the change in fiber weight and indicator 17 does not deflect. Assuming for a second example, that the moisture-content changes while the total paper weight per unit area remains constant, the indicator 10 is not activated, and the change in capacity of the measuring condenser 2 due to change of the moisture-content in the paper strip 1 becomes effective. The indicator 17 is activated and registers in its deflection the deviation in moisture-content of the paper. In the second example it is implicit that the fiber weight changes equally and oppositely to the moisture, thus maintaining the total paper weight constant. Supposing, as a third example, that the fiber weight remains constant while the moisture changes, say in the same amount as in the second example, indicator 10 is activated and adjusts condenser 11 to the extent necessary to cause indicator 17 to deflect in the same amount as in the second example. From these examples it is apparent that the apparatus responds correctly to simultaneous changes in moisture and fiber weight.

According to the invention and in the preferred manner indicators 10 and 17 may be of the moving coil galvanometer type and may include a provision for deflection from zero center, as shown in the drawing, to thereby indicate deviations from standard in either direction of total paper weight and moisture content, respectively. Connections 13 may include the coil shaft of indicator 10. The shaft may rotatively drive condenser 11 to thereby effect the desired capacity change with angle of rotation thereof. Alternatively one may provide suitable torque amplification means, or indicator 10 may be replaced or shunted by the input to such torque amplification means.

Condenser 11 is preferably constructed in a curved shape of such nature as to provide an accurately tracking compensating change in the capacity of the series combination of condensers 11 and 12 with the angle of rotation of the former. Accurate tracking effects a compensating capacity change of such extent as to offset in any angular position of condenser 11 the change in capacity of measuring condenser 2 attributable to a change in total paper weight. Condenser 12 is provided to permit accurate tracking of condenser 11 without undue complication in the curved construction thereof. If desired, condenser 12 may be omitted and condenser 11 shunted directly across measuring condenser 2 in the interest of economy and minimization of variable controls. Omission of condenser 12 may result in some loss of tracking ability and accuracy of compensation, unless condenser 11 is in fact constructed in a complicated manner. If condenser 12 is included, it requires but a small adjustment range and therefore may be of relatively simple construction. Similarly condenser 14 requires but a small adjustment range and therefore likewise may be of relatively simple construction.

Although the apparatus has been described as pertaining to measurement of moisture content and paper, it may be more generally used in a continuous production process of any homogeneous material containing a plurality of ingredients, and will prove especially valuable if the to be measured content of one of these ingredients and changes thereof are small. The apparatus may be used for example in the rolling of sheet plastic where a continuous sheet is tested for constancy of weight per unit area and constancy in the material compound.

It is to be understood that the invention is not limited to the specific details of construction herein described and I do not desire to be limited thereby, reference being had to the appended claims rather than to the foregoing description to determine the scope of the invention.

What I claim is:

1. Apparatus for measuring the moisture content of paper produced by continuous process in strip form from portion to portion of said paper, comprising first and second bridge circuits, a pair of arm junctions in each of said circuits defining output terminals therefor, a source of penetrative radiation and a radiation detector disposed in spaced relation to said paper, said detector connected in one arm of said first circuit as a resistive element, the resistance whereof is determined by the weight of the portion of the paper penetrated by the radiant beam and is changeable in accordance with joint and several changes in moisture content and fiber weight with substantially equal sensitivities per corresponding unit change, said second circuit including in its arms a measuring condenser having said paper passing between its plates and an adjustable condenser, the capacitance of said measuring condenser at least in part being determined jointly by the moisture content and fiber weight of the portion of paper passing between said plates, said capacitance being changeable with joint and several changes thereof, the sensitivities of the capacitance changes per corresponding unit change being respectively higher and lower relative to one another, means for energizing each of said circuits, circuit means including a total paper weight change indicator connected across the output terminals of said first circuit, means connected with said total weight indicator for adjusting said adjustable condenser in accordance with the indication so as to provide a resultant response across the output terminals of said second circuit representing solely changes in moisture content, and second circuit means including a moisture indicator connected across the output terminals of said second circuit.

2. Apparatus for measuring the moisture content of paper produced by continuous process in strip form from portion to portion of said paper, comprising first and second bridge circuits which when both balanced reflect paper of predetermined standard moisture and fiber weights, a source of penetrative radiation and a radiation detector disposed in spaced relation to said paper, said detector connected in one arm of said first circuit as a resistive element, the resistance whereof is determined by the weight of the portion of the paper penetrated by the radiant beam and is changeable in accordance with joint and several changes in moisture content and fiber weight with substantially equal sensitivities per corresponding unit change, said second circuit including in its arms a measuring condenser having said paper passing between its plates and including an adjustable condenser having a mechanically variably positionable element, the capacitance of said measuring condenser at least in part being determined jointly by the moisture content and fiber weight of the portion of paper passing between said plates, said capacitance being changeable with joint and several changes thereof, the sensitivities of the capacitance changes per corresponding unit change being respectively higher and lower relative to one another, means for energizing each of said circuits, electromechanical means responsive to unbalance signal of said first bridge circuit for accordingly positioning said element, whereby such position reflects the changes in total paper weight and the output signal of said second bridge circuit in view of the adjustment of said adjustable condenser reflects solely changes in moisture content, and a moisture indicator responsive to the latter output signal.

3. Apparatus for measuring the moisture content of paper produced by continuous process in strip form from portion to portion of said paper, comprising first and second circuits providing first and second output signals respectively representing total paper weight on one hand and one of fiber weight and moisture weight on the other hand, a source of penetrative radiation and a radiation detector disposed in spaced relation to said paper, said detector connected in said first circuit as a resistive element, the resistance whereof is determined by the weight of the portion of the paper penetrated by the radiant beam and is changeable in accordance with joint and several changes in moisture content and fiber weight with substantially equal sensitivities per corresponding unit change, said second circuit including an electrical transducer having said paper passing in proximity thereto and including an adjustable impedance having a mechanically variably positionable element, the impedance of said transducer at least in part being determined jointly by the moisture weight and fiber weight of the portion of paper passing in such proximity with unequal sensitivities, electromechanical means responsive to said first signal for accordingly positioning said element, whereby such position reflects said total paper weight and said second signal in view of the adjustment of said adjustable impedance reflects solely said one of said fiber and moisture weights, and indicating means responsive to said second signal to reflect said one weight.

4. Apparatus according to claim 3, wherein the aforesaid one weight is moisture weight.

5. Apparatus according to claim 3, provided with the inclusion in the electromechanical means of an indicator for reflecting the total paper weight.

6. Apparatus according to claim 3, wherein the transducer element is a condenser having the paper passing between its plates.

7. Apparatus according to claim 3, wherein the adjustable impedance is a mechanically variable condenser.

8. Apparatus according to claim 3, wherein the radiation source is a radio-active radiator and the detector includes an ionization chamber.

9. Apparatus according to claim 1, wherein the radiation source is a radio-active radiator and the detector includes an ionization chamber.

10. Apparatus according to claim 2, wherein the radiation source is a radio-active radiator and the detector includes an ionization chamber.

References Cited in the file of this patent

UNITED STATES PATENTS

| | | |
|---|---|---|
| 1,379,266 | Keeler | May 24, 1921 |
| 1,573,850 | Naiman | Feb. 23, 1926 |
| 1,708,073 | Allen | Apr. 9, 1929 |
| 1,882,962 | Sawford | Oct. 18, 1932 |
| 2,316,576 | Fearon | Apr. 13, 1943 |
| 2,488,269 | Capp | Nov. 15, 1949 |
| 2,527,208 | Berry et al. | Oct. 24, 1950 |
| 2,535,027 | Anderson | Dec. 26, 1950 |
| 2,586,303 | Clarke | Feb. 19, 1952 |
| 2,588,882 | Rolfson | Mar. 11, 1952 |
| 2,768,629 | Maul | Oct. 30, 1956 |
| 2,815,759 | Molins et al. | Dec. 10, 1957 |

FOREIGN PATENTS

| | | |
|---|---|---|
| 555,211 | Great Britain | Aug. 10, 1943 |
| 591,172 | Great Britain | Sept. 11, 1945 |
| 625,024 | Great Britain | June 21, 1949 |
| 689,857 | Great Britain | Apr. 8, 1953 |